(12) United States Patent
Asano et al.

(10) Patent No.: US 9,280,451 B2
(45) Date of Patent: Mar. 8, 2016

(54) TESTING DEVICE (75) Inventors: Koichi Asano, Chiyoda-ku (JP); Hiroyuki Tsuji, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 219 days.

(21) Appl. No.: 13/997,280

(22) PCT Filed: Jan. 23, 2012

(86) PCT No.: PCT/JP2012/051355
§ 371 (c)(1),
(2), (4) Date: Jun. 24, 2013

(87) PCT Pub. No.: WO2012/111387
PCT Pub. Date: Aug. 23, 2012

(65) Prior Publication Data
US 2013/0283100 A1    Oct. 24, 2013

(30) Foreign Application Priority Data
Feb. 14, 2011 (JP) ................................. 2011-029137

(51) Int. Cl.
G06F 11/00 (2006.01)
G06F 11/36 (2006.01)
H04M 1/24 (2006.01)

(52) U.S. Cl.
CPC ........ *G06F 11/3668* (2013.01); *G06F 11/3672* (2013.01); *G06F 11/3684* (2013.01); *G06F 11/3692* (2013.01); *H04M 1/24* (2013.01)

(58) Field of Classification Search
CPC ............ G06F 11/3668; G06F 11/3684; G06F 11/3692; H04M 1/24
See application file for complete search history.

(56) References Cited

U.S. PATENT DOCUMENTS 7,610,578 B1 * 10/2009 Taillefer et al. ................ 717/124
7,630,708 B2 * 12/2009 So et al. ......................... 455/425

(Continued)

FOREIGN PATENT DOCUMENTS

GB    2 353 610 A    2/2001
JP    05 265806       10/1993

(Continued)

OTHER PUBLICATIONS

Office Action and Search Report issued on Dec. 31, 2014 in the corresponding Chinese Patent Application No. 201280005464.0 (with English Translation and Translation of Category of Cited Documents).

(Continued)

*Primary Examiner* — Joshua P Lottich
(74) *Attorney, Agent, or Firm* — Oblon, McClelland, Maier & Neustadt, L.L.P.

(57) ABSTRACT

A testing device for evaluating operations of software installed in a mobile terminal includes a scenario selecting unit configured to select a scenario that includes information for causing the mobile terminal to execute a function that should be operated by the mobile terminal, a scenario execution determining unit configured to determine whether the scenario selected by the scenario selecting unit is executable, a scenario execution unit configured to execute the scenario determined to be executable by the scenario execution determining unit, and a scenario execution result determining unit configured to determine whether an execution result of the scenario executed by the scenario execution unit is the same as a result expected beforehand. The scenario execution determining unit determines whether the scenario selected by the scenario selecting unit is executable based on the execution result of the scenario executed by the scenario execution unit in the past.

4 Claims, 11 Drawing Sheets

(56) References Cited

U.S. PATENT DOCUMENTS

| | | | |
|---|---|---|---|
| 8,606,262 B1* | 12/2013 | Ross et al. | 455/425 |
| 8,671,394 B1* | 3/2014 | Taillefer | 717/125 |
| 2006/0205397 A1* | 9/2006 | So et al. | 455/423 |
| 2007/0263773 A1* | 11/2007 | Malik et al. | 379/1.01 |
| 2012/0029947 A1* | 2/2012 | Wooldridge et al. | 705/4 |
| 2014/0164836 A1* | 6/2014 | Harbarth et al. | 714/37 |

FOREIGN PATENT DOCUMENTS

| | | |
|---|---|---|
| JP | 2001 331542 | 11/2001 |
| JP | 2006 268666 | 10/2006 |
| JP | 2009 290852 | 12/2009 |
| JP | 2010 190851 | 9/2010 |

OTHER PUBLICATIONS

International Search Report Issued Apr. 10, 2012 in PCT/JP12/051355 Filed Jan. 23, 2012.

Extended European Search Report issued Apr. 8, 2015 in Patent Application No. 12746751.2.

\* cited by examiner

| RESTRICTION CONTENT | RESTRICTION STATE |
|---|---|
| TELEPHONE CALL (NORMAL) | NONE |
| TELEPHONE CALL (EMERGENCY) | RESTRICTED |
| PACKET CALL | NONE |
| USE CHARGED SERVICES | RESTRICTED |

FIG.9

| SCENARIO DEFINITION NAME | NUMBER OF FAILURES |
|---|---|
| WEB PAGE CONNECTION | 2 |
| SETTING EXECUTION | 10 |
| ⋮ | ⋮ |

FIG.10

| RESTRICTION CONTENT | RESTRICTION STATE |
|---|---|
| TELEPHONE CALL (NORMAL) | NONE |
| TELEPHONE CALL (EMERGENCY) | RESTRICTED |
| PACKET CALL | NONE |
| USE CHARGED SERVICES | RESTRICTED |
| SETTING EXECUTION | RESTRICTED |
| ⋮ | ⋮ |

TESTING DEVICE

TECHNICAL FIELD

The present invention relates to a testing device for a mobile terminal.

BACKGROUND ART

Because of its functional advancement, operation procedures of a mobile terminal have become more complicated. And with the advancement in functionalities, operation steps for executing a function have also increased. Furthermore, the volume of software to be stored in a mobile terminal is also increasing. With the increase in software volume, the number of defects is also increasing.

Furthermore, with the advancement of functionalities of mobile terminals, software defects that cause so-called "reset/freeze" problems are increasing. Regarding these defects, it is practically impossible to detect them all beforehand.

Therefore evaluating software installed in a mobile terminal has been performed.

For example, an evaluating method using an automated evaluation tool is known. In order to use the evaluation method of the automated evaluation tool, it is necessary for software installed in the target mobile terminal to include, as one of operation methods of the software, predefined operation procedures. Furthermore, it is necessary for a user to be able to use desired functions by pressing menu buttons or by pressing ten key buttons.

Evaluation methods using automated evaluation tools include a functional method and a random method.

In the functional method, a specific function of a mobile terminal is evaluated by a predefined operational procedure. By evaluating a specific function, it is possible to check if a specific function of software installed in a mobile terminal functions properly in accordance with the required specification.

In the random method, a function for evaluation target is not specified. Instead, operations to be evaluation target are randomly generated by a computer. By generating operations to be random evaluation targets by a computer, it is possible to check if the software installed in the mobile terminal continues working properly. For example, operation procedures unexpected (as much as possible) for the software installed in the mobile terminal are generated. By generating unexpected operation procedures, software defects can be detected.

For example, a method for evaluating software installed in a mobile terminal is known (see, for example, Patent Document 1).

RELATED ART DOCUMENT

[Patent Document 1] Japanese Patent Application Publication No. 2009-290852

SUMMARY OF THE INVENTION

Problem to be Solved by the Invention

In the random method, keys to be operated are randomly generated. Because keys to be operated are randomly generated, there is a possibility that the procedure for operating a specific function of evaluation target software cannot be executed properly as expected.

Furthermore, in the case where the number of operations for operating a specific function is big, the possibility of executing the procedure for operating that specific function becomes low. As a result, it becomes difficult to increase the use coverage of the functions of the evaluation target software.

Also, because keys to be operated are randomly generated, it becomes impossible to avoid essentially undesirable operations such as, for example, an emergency call, a call for charged services, etc.

By evaluating a mobile terminal using the random method for a certain amount of time, it becomes possible to detect defects. But it is difficult to overcome the problem above.

It is an object of the present invention, in order to solve the above problems, to evaluate software installed in a mobile terminal efficiently.

Means for Solving the Problem

According to an embodiment of the present invention, a testing device for evaluating operations of software installed in a mobile terminal is provided, the testing device including a scenario selection unit configured to select a scenario that includes information for executing a function to be performed by the mobile terminal, a scenario execution determining unit configured to determine whether the scenario selected by the scenario selection unit is executable, a scenario execution unit configured to execute the scenario determined to be executable by the scenario execution determining unit, and a scenario execution result determining unit configured to determine whether an execution result of the scenario executed by the scenario execution unit is the same as a result expected beforehand, wherein the scenario execution determining unit determines whether the scenario selected by the scenario selection unit is executable based on an execution result of the scenario executed in the past by the scenario execution unit.

Effect of the Present Invention

According to the disclosed present embodiment, it is possible to test software installed in a mobile terminal efficiently.

EMBODIMENTS FOR CARRYING OUT THE INVENTION

In the following, embodiments of the present invention will be described with reference to the accompanying drawing. Note that the same referral numbers are used through out the figures when referring to the same functionalities, and the repeated same descriptions are omitted.

Embodiments

An automated evaluation tool of the present embodiment is installed in, for example, a PC (Personal Computer). Note that it may be installed in a device for testing software installed in a mobile terminal.

In the present embodiment, as an example, it is described for the case where it is installed in a PC. By having an automated evaluation tool installed in a PC, the PC functions as a testing device 100 for a mobile terminal.

The testing device 100 performs the testing efficiently by generating target functions at random, determining whether the scenario corresponding to the function can be executed, and automatically omitting the scenario that is not executable from testing items based on the determined result.

Figure 1:
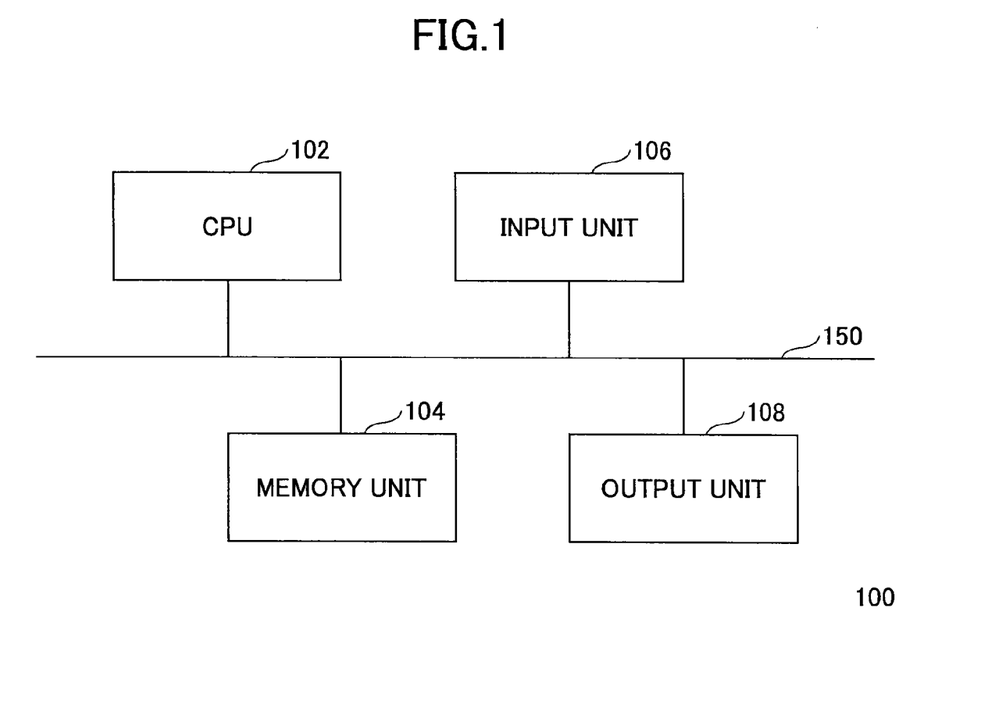
FIG. 1 is a drawing illustrating an example of a testing device of the present embodiment.

FIG. 1 is an example of a testing device 100 of the present embodiment in which an automated evaluation tool is stored.

The testing device 100 includes a central processing unit (CPU) 102, a memory unit 104, an input unit 106, and an output unit 108. The CPU 102, the memory unit 104, the input unit 106 and the output unit 108 are connected via a bus 150.

The CPU 102 performs controlling of the memory unit 104, the input unit 106 and the output unit 108. The CPU 102 functions based on the program stored in the memory unit 104, and performs predefined processes.

In the memory unit 104, applications, an operating system (OS) and an automated evaluation tool are stored. The memory unit 104 is, for example, an external memory device that stores data or programs in a computer. For example, it includes a hard disk (fixed disk), a floppy disk, an MO (Magneto-Optical disk), a CD-R (Compact Disk Recordable), a magnetic tape, etc. Applications are software that has functions to execute the tasks to be performed on the testing device by a user. For example, applications include a word processor, spreadsheet software, a data base management system (DBMS), a media player, etc. The operating system is software that provides hardware-abstracted interfaces to the application software in the testing device 100. The automated evaluation tool is a tool for evaluating at least one of software quality or software functionality by causing software installed in the mobile terminal to operate by operating the mobile terminal on behalf of the user.

The input unit 106 is configured with, for example, a keyboard or a mouse, and sends instructions to the testing device 100 or performs data input. The instructions include instructions for the operating system, instructions for the applications, and instructions for the automated evaluation tool.

The output unit 108 is configured with, for example, a display, and displays process statuses or process results by the testing device 100. The process statuses or process results include those by the operating system, applications, or the automated evaluation tool. The display includes a liquid crystal display, a CRT (Cathode Ray Tube) display, a plasma (PDP: Plasma Display Panel) display, an organic EL (Electro-Luminescence) display, etc.

Figure 2:
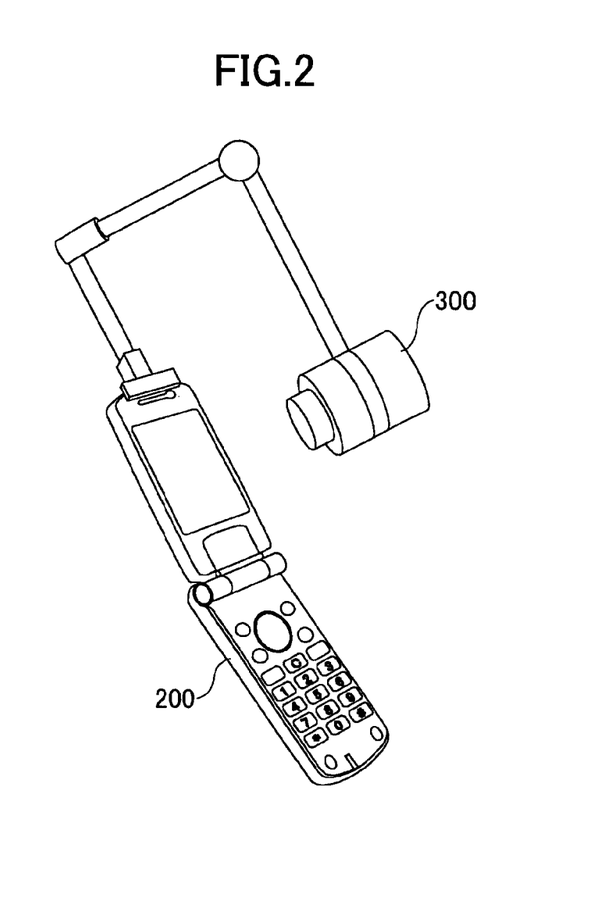
FIG. 2 is a drawing illustrating an example of a mobile terminal of a testing system of the present invention.

FIG. 2 is an example of a configuration of an evaluation system for evaluating software installed in the mobile terminal 200.

<An Example of a Configuration of the Testing System>

In the testing system, the mobile terminal 200 and the testing device 100 are connected. For example, they may be connected by a cable (not shown). The mobile terminal 200 preferably includes a user interface (UI) for accepting user operations through an input unit. For example, the input unit includes a numerical keypad, etc. The mobile terminal 200 may be of a handheld type or of a headset type. Also, the mobile terminal 200 does not need to include an input unit if it can change its internal operation through electrical signals. For example, the mobile terminal 200 may be of a card type or of a module type.

Also, the testing system is provided with a camera 300 for taking pictures of a display unit of the mobile terminal 200. At least one of a picture or a motion picture of the display taken by the camera 300 is inputted to the testing device 100. For example, by connecting between the camera 300 and the testing device 100 with a cable (not shown), transmission and reception of at least one of a picture and a motion picture between the camera 300 and the testing device 100 through the cable may be performed.

<Automated Evaluation Tool>

Figure 3:
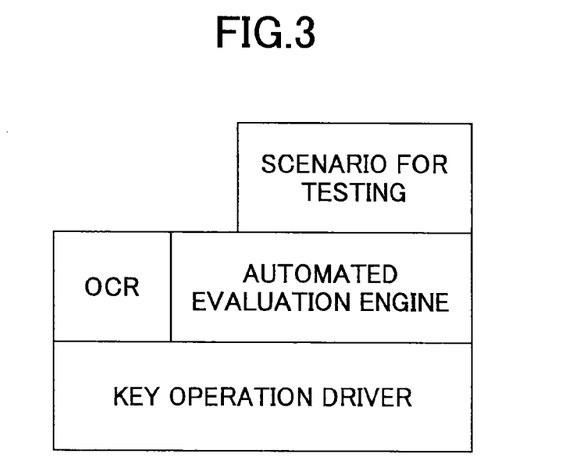
FIG. 3 is a drawing illustrating an example of an automated evaluation tool of the present embodiment.

FIG. 3 is an example of a configuration of an automated evaluation tool.

The automated evaluation tool includes a key operation driver. The key operation driver is software for providing an interface to the mobile terminal 200 for the CPU 102 that functions as an operating system.

The automated evaluation tool includes an automated evaluation engine. The automated evaluation engine is software for causing the CPU 102 that functions as an automated evaluation tool to perform functions for evaluating the software installed in the mobile terminal 200.

The automated evaluation tool includes an OCR (Optical Character Reader). The OCR optically reads characters from a picture taken by the camera 300 and identifies characters by matching patterns that are stored beforehand. The OCR may optically read characters from a moving picture taken by the camera 300 and identifies characters by matching patterns that are stored beforehand.

<Testing Scenarios>

The automated evaluation tool includes scenarios for testing. The scenarios for testing are scenarios which indicate operation procedures to be executed by the mobile terminal 200 when evaluating target functions using the automated evaluation tool. For example, scenarios for testing are generated by running the automated evaluation tool.

Figure 4:
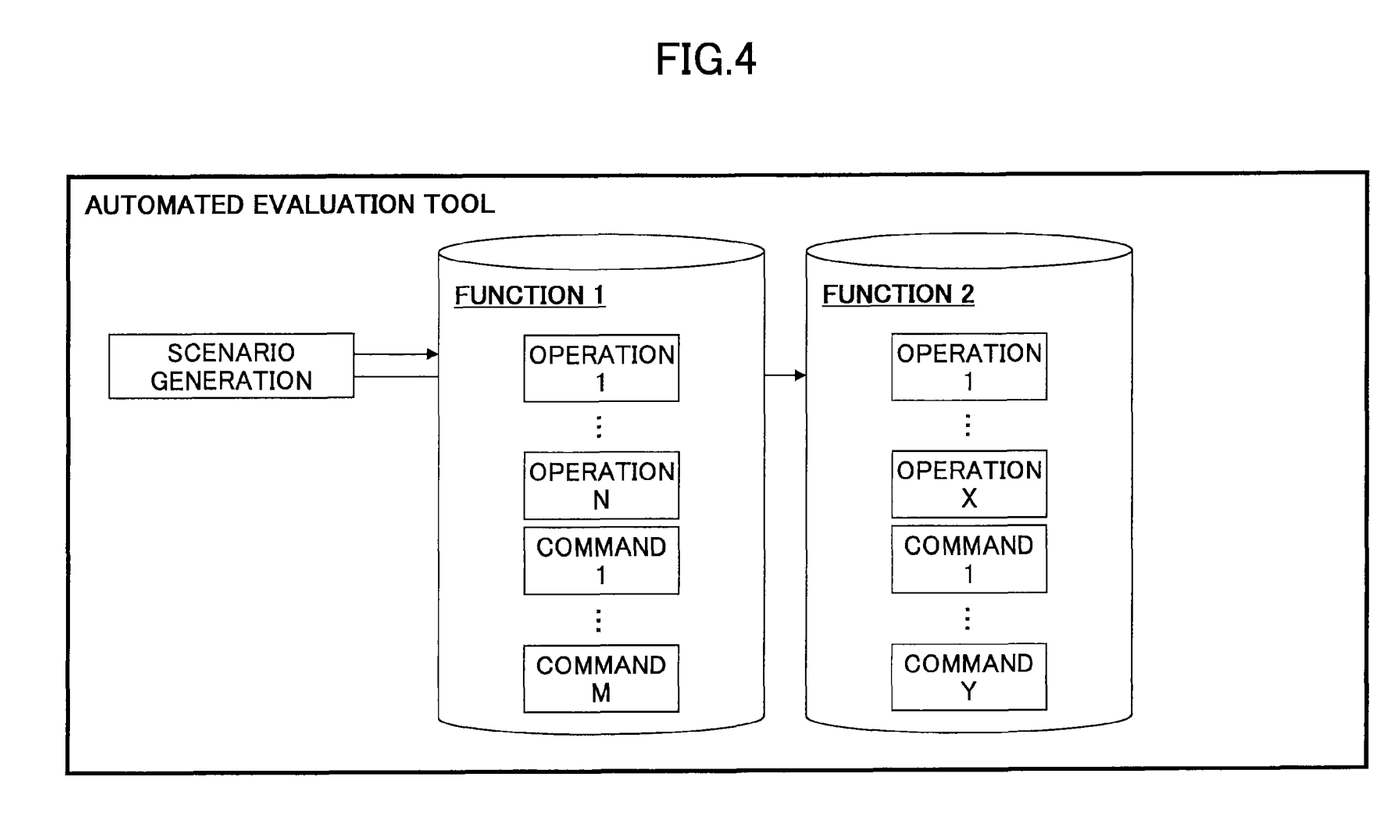
FIG. 4 is a drawing illustrating an example of a scenario of the present embodiment.

FIG. 4 is a drawing illustrating an example of a scenario for testing. In FIG. 4, as an example, two functions (function 1 and function 2) are shown.

When a scenario for testing is generated, a name (function name) to define the scenario is generated. For example, "function 1" and "function 2" are generated as function names. Furthermore, for each function, "operations" that indicate keys for executing the function and "commands" that indicate the flow of the keys are described. For example, regarding the function indicated by the function name "function 1", information indicating keys to be operated ("operation 1" . . . "operation n") and commands for controlling operation sequence of the keys to be operated ("command 1" . . . "command m") are included. Also, regarding the function indicated by the function name "function 2", information indicating keys to be operated ("operation 1" . . . "operation x") and commands for controlling operation sequence of the keys to be operated ("command 1" . . . "command y") are included.

Also, a single function may be defined by putting together multiple functions. For example, a single new function may be defined by putting together multiple functions of an evaluation target.

Figure 5:
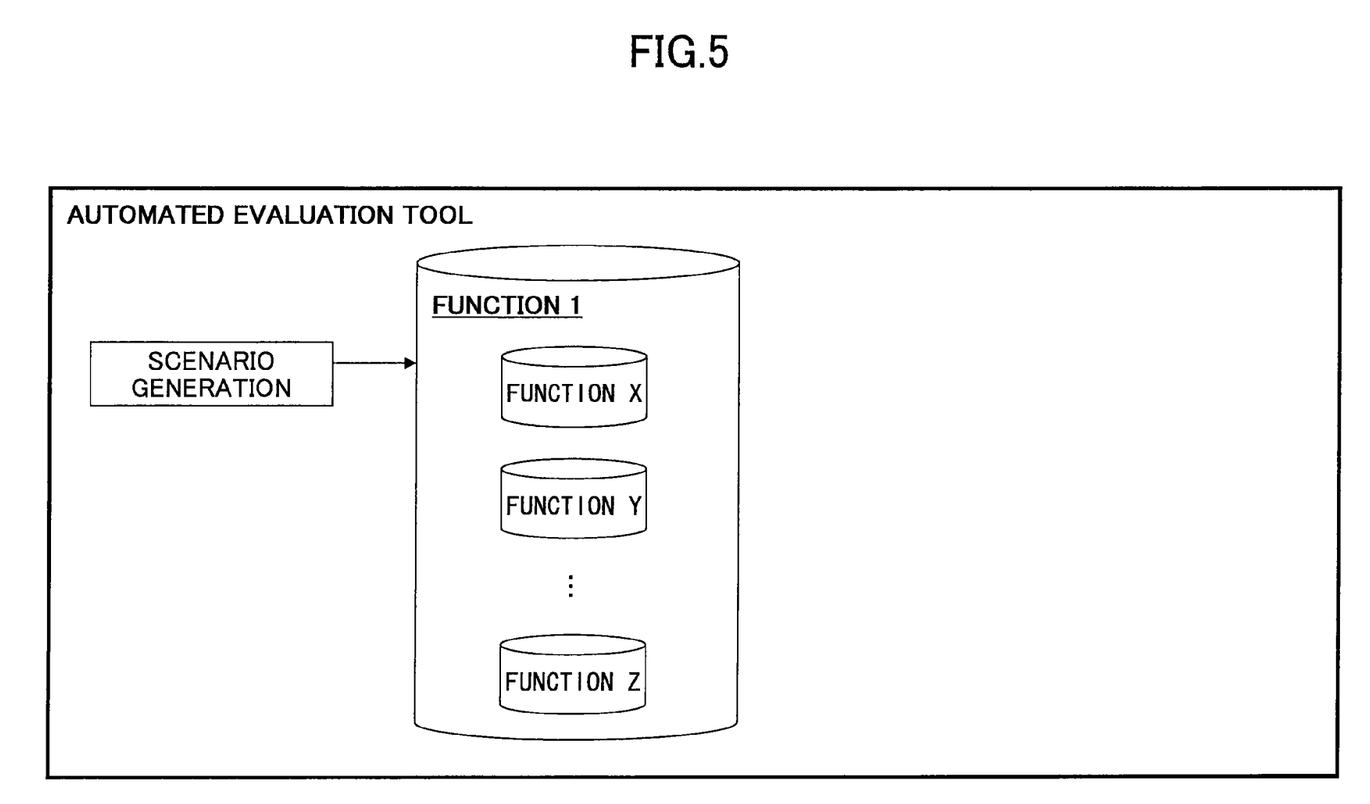
FIG. 5 is a drawing illustrating an example of a scenario of the present embodiment.

FIG. 5 illustrates an example in which multiple functions are put together to be defined as one new function.

In an example shown in FIG. 5, multiple functions ("function X", "function Y" . . . "function Z") are put together to be defined as a single new function. In other words, in the "function 1", multiple functions ("function X", "function Y" . . . "function Z") are nested.

<Scenario Control Information>

Scenario control information to be controlled by the automated evaluation tool will be described. For example, the automated evaluation engine registers scenario control information beforehand.

Figure 6:
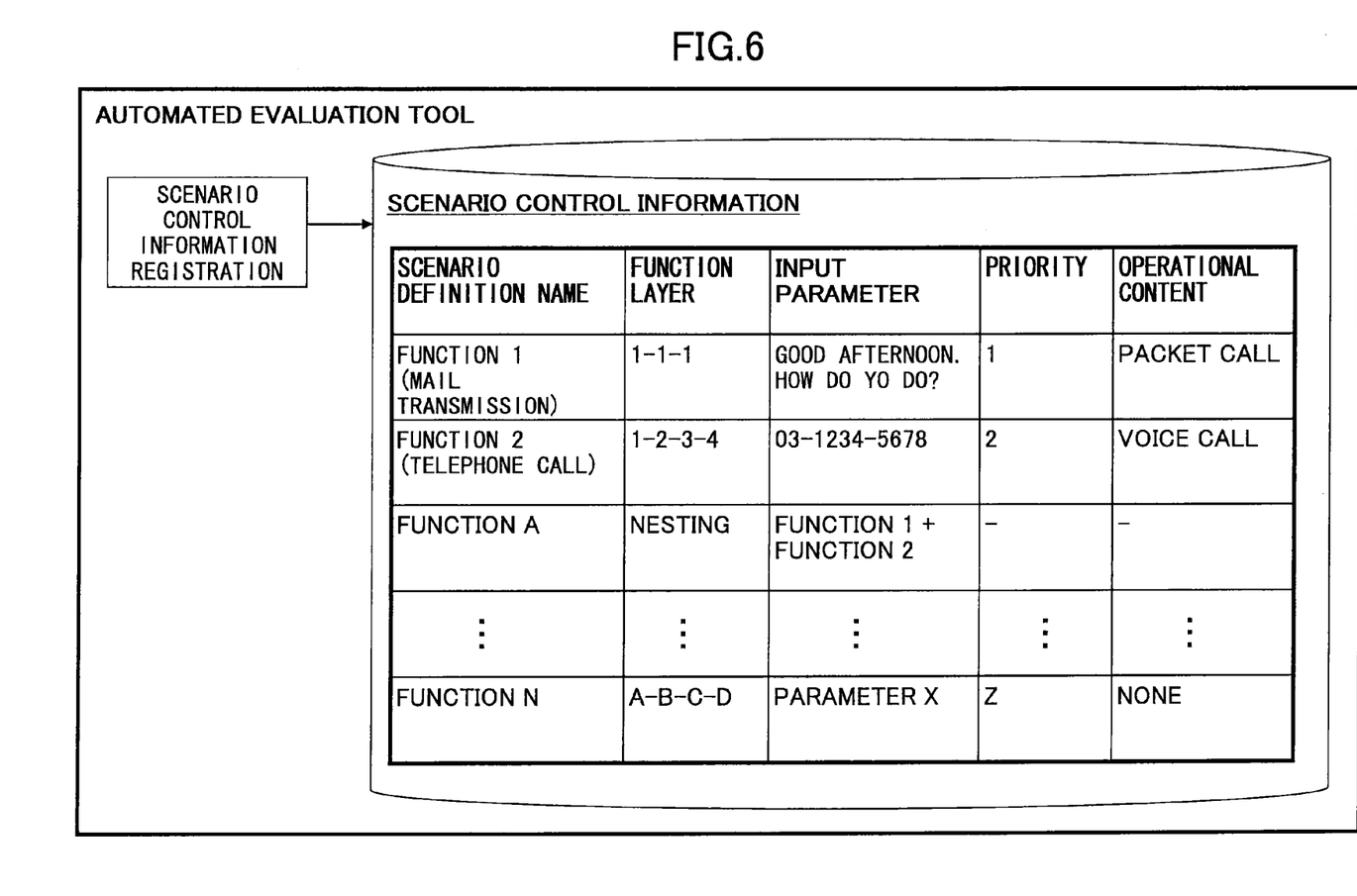
FIG. 6 is a drawing illustrating an example of scenario control information of the present embodiment.

FIG. 6 illustrates an example of scenario control information stored in the memory unit 104.

In the scenario control information shown in FIG. 6, a scenario definition name is stored. As for the scenario definition name, at least one of a function described referring to FIG. 4 and a function described referring to FIG. 5 is stored.

In the scenario control information, function layers corresponding to the stored scenario name, input parameters, priority and an operational content are stored. The function layer is for indicating operation procedures for executing the function, and the operation procedures are indicated by numbers.

In an example shown in FIG. 6, "function 1" is stored as a scenario definition name that is related to mail transmission, and "1-1-1", "Good afternoon. How do you do? . . . ", "1", and "packet call" are stored as a functional layer, an input parameter, a priority, and an operational content corresponding to the "function 1", respectively.

Also, "function 2" is stored as a scenario definition name that is related to telephone call, and "1-2-3-4", "03-1234-5678", "2", and "voice call" are stored as a functional layer, an input parameter, a priority, and an operational content corresponding to the "function 2", respectively.

Also, "function A" is stored as a scenario definition name that causes multiple functions to function, and "nesting", "function 1+function 2", "-", "-" are stored as a functional layer, an input parameter, a priority, and an operational content corresponding to the "function A", respectively.

Also, "function N" is stored as a scenario definition name that causes multiple functions to function, and "a-b-c-d", "parameter x", "Z", and "none" are stored as a functional layer, an input parameter, a priority, and an operational content corresponding to the "function N", respectively.

<Functions of Automated Evaluation Tool>

Figure 7:
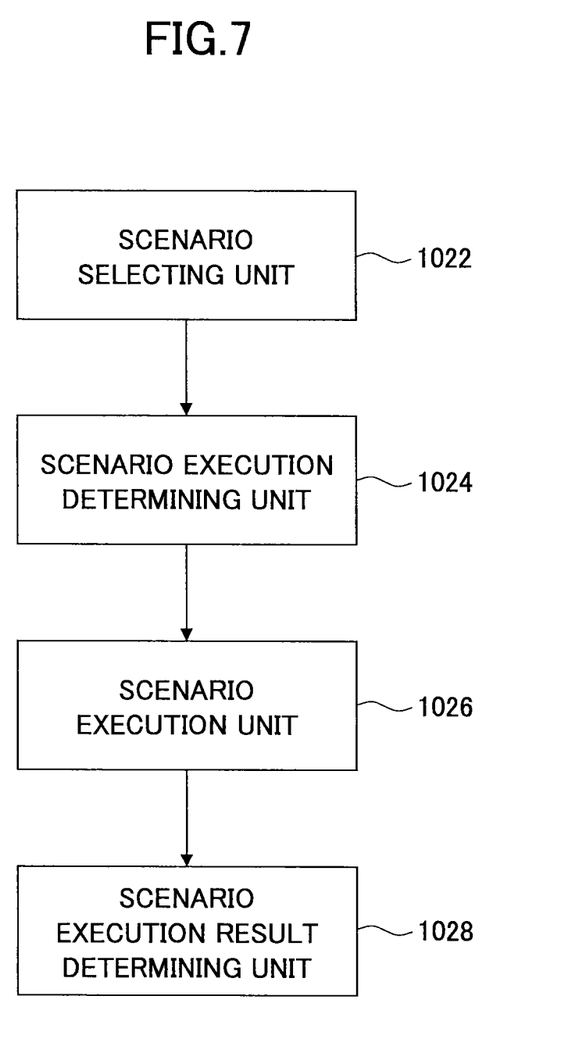
FIG. 7 is a functional block diagram illustrating an example of a testing device of the present embodiment.

FIG. 7 illustrates functions of the testing device 100.

The testing device 100 includes a scenario selecting unit 1022. The scenario selecting unit 1022 selects a scenario to be executed by the mobile terminal 200. For example, the scenario selecting unit 1022 may select a scenario to be executed by the mobile terminal randomly from multiple scenarios set beforehand. When selecting a scenario, a function that outputs random values may be used.

The testing device 100 includes a scenario execution determining unit 1024. The scenario execution determining unit 1024 is connected to the scenario selecting unit 1022. The scenario execution determining unit 1024 determines whether a scenario selected by the scenario selecting unit 1022 is executable. For example, the scenario execution determining unit 1024, referring to the scenario control information described by referring to FIG. 6, obtains the "operational content" corresponding to the scenario selected by the scenario selecting unit 1022. The scenario execution determining unit 1024, referring to scenario execution information, determines whether obtained operational content is one that is restricted.

Figure 8:
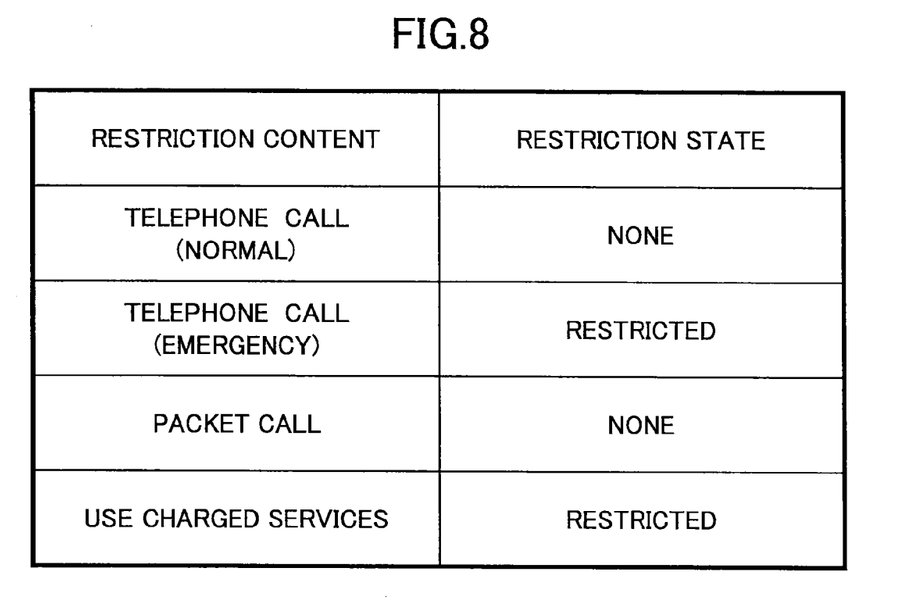
FIG. 8 is a functional block diagram illustrating an example of scenario execution information of the present embodiment.

FIG. 8 illustrates an example of scenario execution information stored in the memory unit.

In the scenario execution information, restriction content and restriction state are included. In an example shown in FIG. 8, "telephone call (normal)", "telephone call (emergency)", "packet call", and "use charged services" are stored as restriction content, and "none", "restricted", "none", and "restricted" are stored as restriction states, respectively.

In the case where the operation content corresponding to the scenario selected by the scenario selecting unit 1022 is restricted, the scenario execution determining unit 1024 determines that the scenario is non-executable. On the other hand, in the case where the operation content corresponding to the scenario selected by the scenario selecting unit 1022 is not restricted, the scenario execution determining unit 1024 determines that the scenario is executable. The scenario execution determining unit 1024 removes the scenario that is determined to be non-executable from the scenarios set by the scenario selecting unit 1022.

The testing device 100 includes a scenario execution unit 1026. The scenario execution unit 1026 is connected to the scenario execution determining unit 1024. The scenario execution unit 1026 executes remaining scenarios in which the scenario determined to be non-executable by the scenario execution determining unit 1024 has already been removed. The scenario execution unit 1026 inputs the result of the scenario execution to a scenario execution result determining unit 1028.

The testing device 100 includes the scenario execution result determining unit 1028. The scenario execution result determining unit 1028 is connected to the scenario execution unit 1026. The scenario execution result determining unit 1028, based on the execution result of the scenario inputted by the scenario execution unit 1026, determines whether the execution result of the scenario is the same as a result expected beforehand. In the case where it is determined that the execution result of the scenario is the same as the result expected beforehand, it determines that the execution of the scenario has succeeded. On the other hand, in the case where it is determined that the execution result of the scenario is different from the result expected beforehand, it determines that the execution of the scenario has failed. The scenario execution result determining unit 1028 reflects the execution result of the scenario in execution result information. In the execution result information, for each scenario, the number of failed scenario executions is stored. Note that, for example, the result expected beforehand by the scenario execution is stored beforehand for each scenario in the memory unit 104.

Figure 9:
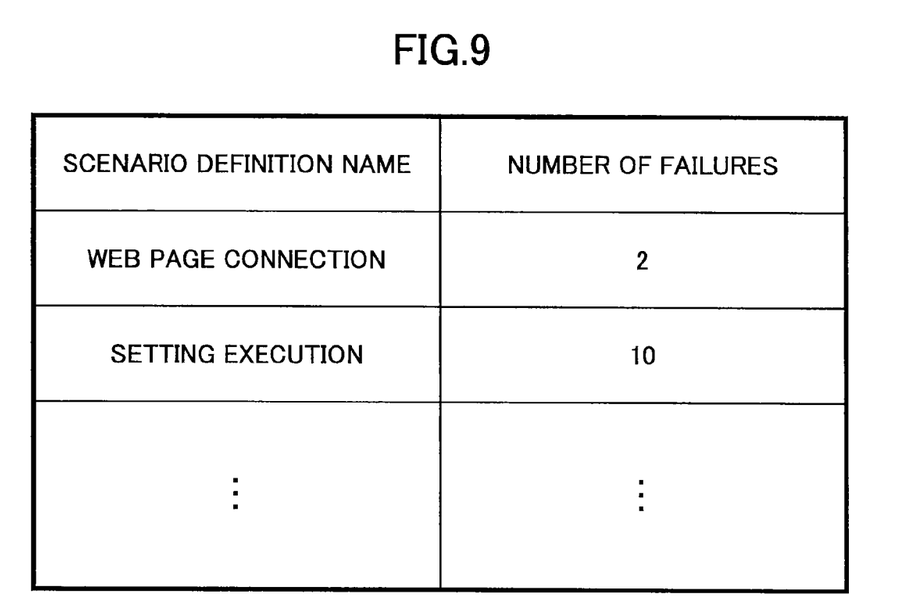
FIG. 9 is a functional block diagram illustrating an example of scenario execution result information of the present embodiment.

FIG. 9 illustrates an example of execution result information stored in the memory unit 104.

In the execution result information, a scenario definition name is associated with a number of failures.

In an example shown in FIG. 9, "web page connection" and "setting execution" are stored as scenario definition names, and "2" and "10" are stored respectively as numbers of failures.

The scenario execution result determining unit 1028, referring to the execution result information, determines whether there is a scenario whose number of failures is equal to or greater than a predefined threshold. The scenario execution result determining unit 1028 adds the scenario, whose number of failures is equal to or greater than a predefined threshold, to the scenario execution information.

Figure 10:
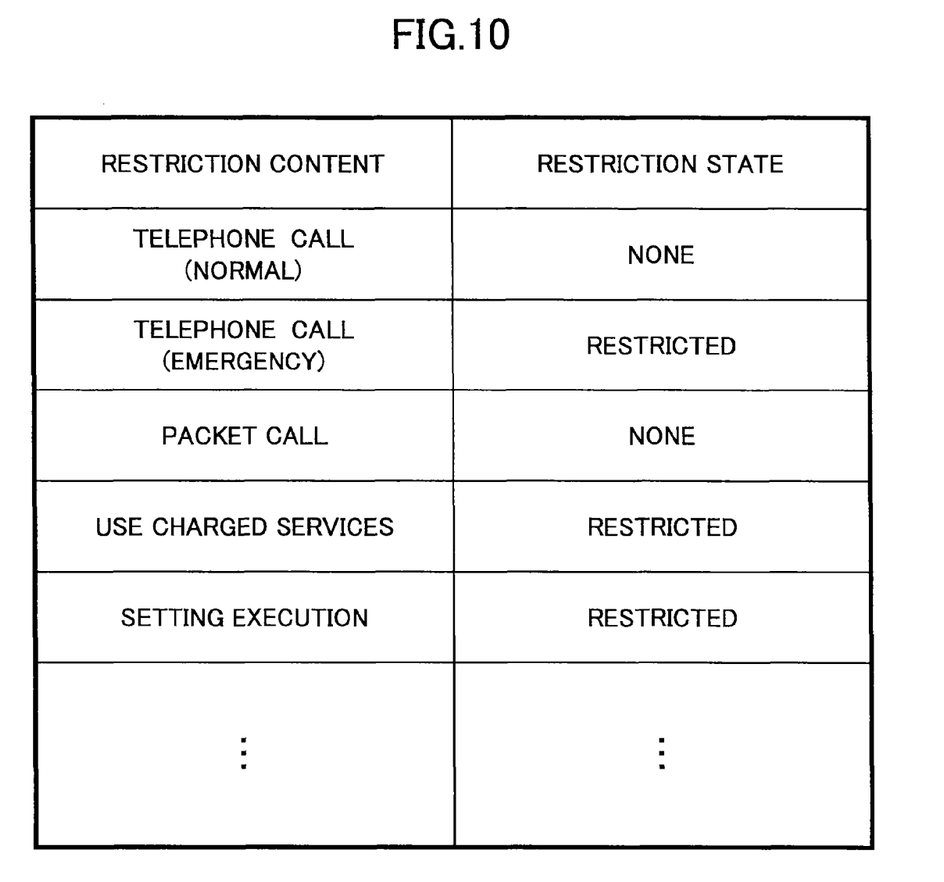
FIG. 10 is a functional block diagram illustrating an example of scenario execution information of the present embodiment.

FIG. 10 illustrates the case where the predefined threshold is set at "10". In this case, because the number of failures of "setting execution" included in the execution result information is "10", the scenario execution result determining unit 1028 adds the "setting execution" to the scenario execution information as "restricted".

FIG. 10 illustrates an example in which the "setting execution" is added to the scenario execution information.

<Operations of the Testing Device>

Figure 11:
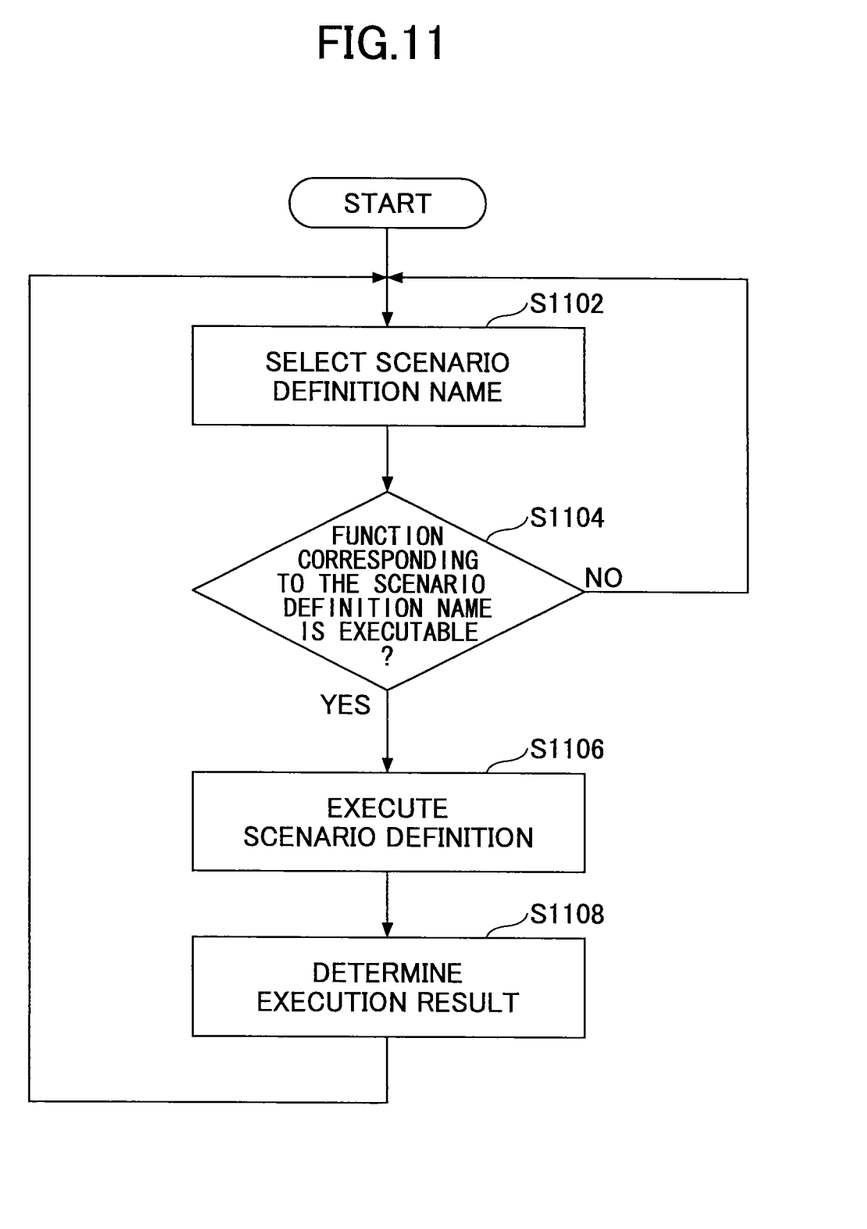
FIG. 11 is a flowchart illustrating an example of operations of a testing device of the present embodiment.

FIG. 11 illustrates the operations of the testing device 100.

The testing device 100 selects a scenario definition name (step S1102). Multiple scenario definition names may be selected. For example, the scenario selecting unit 1022 selects a scenario definition name.

The testing device 100 determines whether the function corresponding to the scenario definition name selected by the step S1102 is executable (step S1104). For example, the scenario execution determining unit 1024, referring to the scenario execution information, by determining whether the scenario selected by the step S1102 is restricted, determines whether it is executable. In the case where it is restricted, the scenario execution determining unit 1024 determines that it is not executable, and in the case where it is not restricted, the scenario execution determining unit 1024 determines that it is executable.

In the case where the scenario is executable (step S1104: YES), the testing device 100 executes the scenario (step S1106). Here, in the case where multiple scenarios are selected by step S1102, it is determined that the scenarios are executable in the case where there are executable scenarios. For example, the scenario execution unit 1026 executes executable scenarios.

On the other hand, in the case where it is determined that the scenario is not executable (step S1104: NO), the testing device 100 returns to step S1102.

The testing device 100 determines the execution result of the scenario (step S1108). For example, the scenario execution result determining unit 1028, by determining whether the execution result of the scenario is the same as the result expected beforehand, determines whether the execution result of the scenario is successful.

After the determination of the execution result of the scenario by step S1108, it returns to step S1102.

<Detailed Operations of the Scenario Execution Determining Unit>

Figure 12:
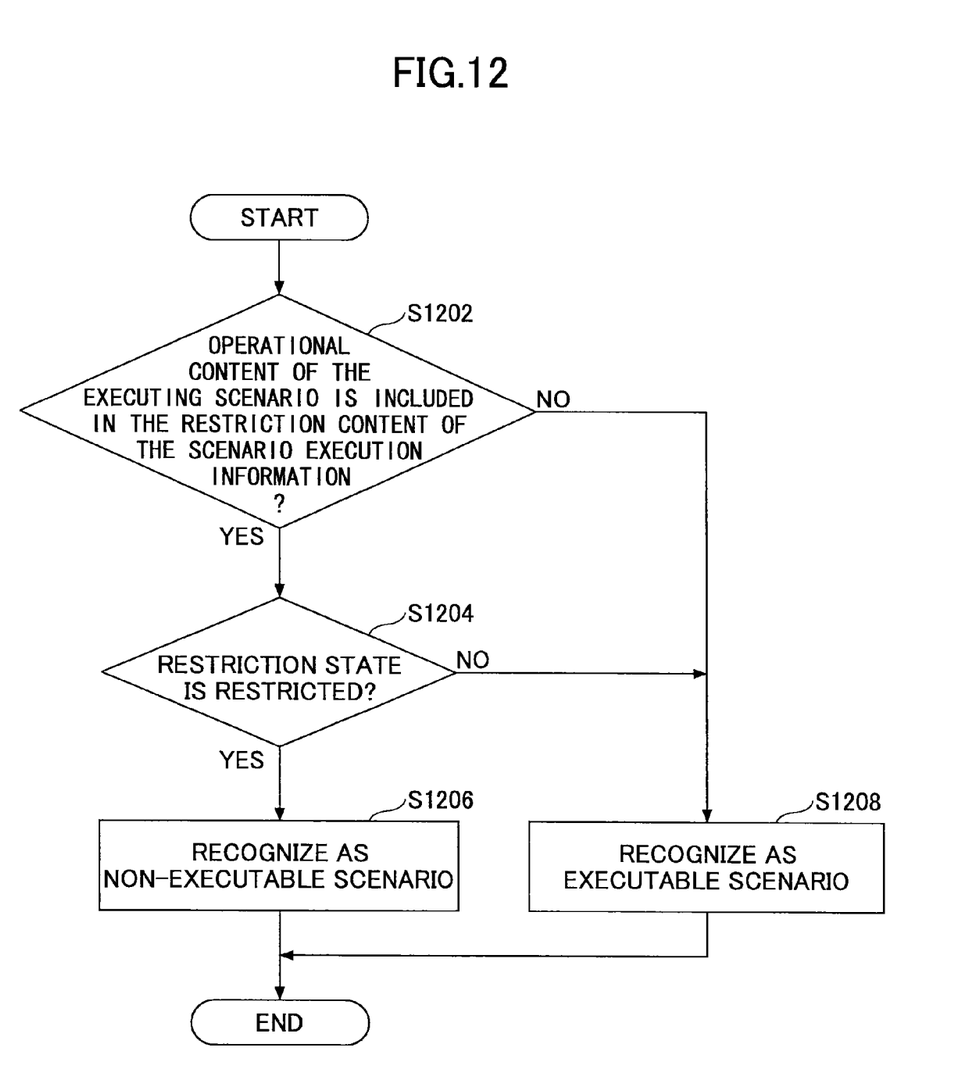
FIG. 12 is a flowchart illustrating an example of operations of a testing device of the present embodiment.

FIG. 12 illustrates detailed operations executed by the scenario execution determining unit 1024.

When operations of the scenario execution determining unit 1024 are executed, the scenario execution information may be generated by the user. That is, in addition to the scenario execution information to be stored in the testing device 100, scenario execution information to be set each time by the user is generated. Here, it is determined whether the scenario is executable based on the scenario execution information set by the user.

The scenario execution determining unit 1024 determines whether the "operational content" of the executing scenario is included in the restriction content of the scenario execution information (step S1202).

In the case where it is determined that the "operational content" of the executing scenario is included in the restriction content of the scenario execution information (step S1202: YES), it is determined whether the "restriction state" is restricted (step S1204).

In the case where the "restriction state" is restricted (step S1204: YES), it is recognized as a non-executable scenario (step S1206). Here, the scenario determined to be non-executable may be added to the scenario execution information to be stored in the testing device 100.

In step S1202, in the case where it is not determined the "operational content" of the executing scenario is included in the restriction content of the scenario execution information (step S1202: NO), or in step S1204, in the case where the "restriction state" is not restricted (step S1204: NO), it is recognized as an executable scenario (step S1208).

<Detailed Operations of the Scenario Execution Result Determining Unit>

Figure 13:
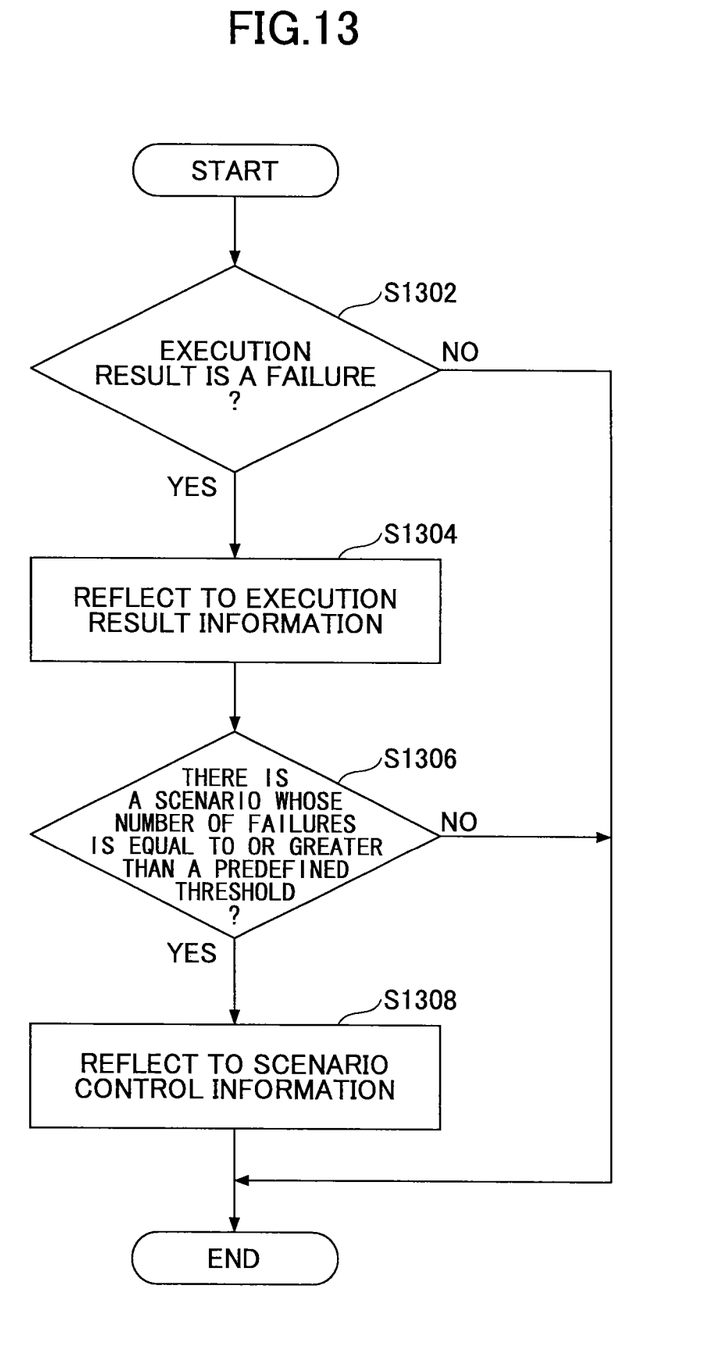
FIG. 13 is a flowchart illustrating an example of operations of a testing device of the present embodiment.

FIG. 13 illustrates detailed operations executed by the scenario execution result determining unit 1028.

The scenario execution result determining unit 1028 determines whether the scenario execution result is a failure (step S1302).

In the case where it is determined that the scenario execution result is a failure (step S1302: YES), it is reflected in the execution result information (step S1304).

It is determined whether there is a scenario, the number of failures of which is equal to or greater than the predefined threshold (step S1306).

In the case where it is determined there is a scenario, the number of failure of which is equal to or greater than the predefined threshold (step S1306: YES), it is reflected in the scenario execution information (step S1308).

In step S1302, in the case where it is not determined that the scenario execution result is a failure (step S1302: YES), or in step S1302, in the case where it is not determined that there is a scenario, the number of failures of which is equal to or greater than the predefined threshold (step S1306: NO), the execution ends.

Effects of the Present Embodiment

By recording the execution results of the scenarios, and by automatically removing the scenario, the number of execution failures of which is equal to or greater than the predefined threshold, from the testing items, testing can be performed efficiently.

Because of its functional advancement, operation procedures of a mobile terminal have become more complicated. And with the advancement in functionalities, operation steps for executing a function have also increased. Furthermore, the volume of software to be stored in a mobile terminal is also increasing. With the increase in software volume, the number of defects is also increasing.

With the advancement of functionalities of mobile terminals, software defects that cause so-called "reset/freeze" problems are increasing. Regarding these defects, it is practically impossible to detect them all beforehand.

In the present embodiment, "functions" for target operations are generated at random when evaluating the software. By randomly generating functions, compared to the case where keys to be operated are generated, because the keys to be operated and the operational sequence of the keys are specified, functions can be evaluated without depending on an operation method (number of operation steps) of specific functions. The use coverage of functions of the evaluation target can be improved. It can be determined for each function as to whether to restrict it. The coverage of a specific function can be controlled.

In addition to the present embodiment above, the following items are disclosed:

(1) A testing device for evaluating operations of software installed in a mobile terminal, the testing device including a scenario selecting unit configured to select a scenario that includes information for causing the mobile terminal to execute a function that should be operated by the mobile terminal, a scenario execution determining unit configured to determine whether the scenario selected by the scenario selecting unit is executable, a scenario execution unit configured to execute the scenario determined to be executable by the scenario execution determining unit, and a scenario execution result determining unit configured to determine whether an execution result of the scenario executed by the scenario execution unit is the same as a result expected beforehand, wherein the scenario execution determining unit determines whether the scenario selected by the scenario selecting unit is executable based on the execution result of the scenario executed by the scenario execution unit in the past (2) The testing device according to (1), wherein the scenario execution determining unit determines that the scenario is not executable in the case where the scenario selected by the scenario selecting unit is a scenario whose number of times the execution result of which executed in the past by the scenario execution unit was determined to be different from a result expected beforehand is equal to or greater than a predefined threshold (3) The testing device according to (1) or (2), the testing device further including a first table configured to associate a scenario with a number of times when the execution result of the scenario is determined by the execution result determining unit to be different from a result expected beforehand, a second table configured to associate a scenario whose number of times the execution result of which executed by the scenario execution unit was determined to be different from a result expected beforehand is equal to or greater than a predefined threshold with information indicating whether the scenario is executable or not, wherein the scenario execution result determining unit, in the case where the execution result of the scenario executed by the scenario is determined to be different from the result expected beforehand, reflects it in the first table, and the scenario execution determining unit, referring to the second table, determines whether the scenario selected by the scenario selecting unit corresponds to a non-executable scenario (4) The testing device according to one of (1) through (3), wherein the scenario includes one or a plurality of the functions that should be operated by the mobile terminal (5) The testing device according to one of (1) through (4), wherein the scenario selecting unit selects randomly from scenarios set beforehand.

For the sake of convenience, the present embodiments are described using specific numbers in order to facilitate understanding of the invention, but these numbers are used just as an example and, unless otherwise noted, any appropriate number can be used.

The present invention has been described above referring to specific embodiments, but each embodiment is used just as an example, and a person skilled in the art would easily understand various modified embodiments, amended embodiments and replacement embodiments. For the sake of convenience, devices of the present embodiments are described using functional block diagrams, but those devices can be implemented as hardware, software, or combination of both. The present invention is not limited to these embodiments above, but includes various variations and modifications which may be made without departing from the spirit of the present invention.

The present application is based on and claims the benefit of priority of Japanese Priority Application No. 2011-029137 filed on Feb. 14, 2011, the entire contents of which are hereby incorporated by reference.

DESCRIPTION OF THE REFERENCE NUMERALS

100 Testing device
102 Central processing unit (CPU)
1022 Scenario selecting unit
1024 Scenario execution determining unit
1026 Scenario execution unit
1028 Scenario execution result determining unit
104 Memory unit
106 Input unit
108 Output unit
150 Bus
200 Mobile terminal
300 Camera

The invention claimed is:

1. A testing device for evaluating operations of software installed in a mobile terminal, the testing device comprising:
a central processing unit (CPU) configured to
select, from a first plurality of scenarios set beforehand that includes an operation procedure for causing the mobile terminal to execute a function that should be operated by the mobile terminal, a second plurality of the scenarios which should be executed by the mobile terminal;
store scenario control information including a scenario name, an operation procedure for executing a corresponding function, and a corresponding operational content;
store scenario execution information including the operational content and information indicating whether the operational content should be restricted;
determine whether the operational content of a selected scenario of the second plurality of the scenarios is executable; and
execute the scenario including the operational content determined to be executable, wherein the CPU is further configured to obtain the operational content of the selected scenario of the second plurality of the scenarios from the scenario control information, and determine whether the operational content of the selected scenario of the second plurality of the scenarios is executable based on the scenario execution information.

2. The testing device as claimed in claim 1, wherein the CPU is further configured to
determine whether an execution result of the executed scenario is the same as a result expected beforehand; and
store scenario execution result information including a number of failures of the scenario execution and a scenario name of the executed scenario,
wherein the CPU is configured to determine that the scenario execution has failed in a case where it is determined that the execution result is different from the result expected beforehand, reflect it to the number of failures of the scenario execution of the scenario execution result information, and add the scenario of the scenario execution result information whose number of failures of the scenario execution is equal to or more than a predetermined threshold to the scenario execution information.

3. The testing device as claimed in claim 1, wherein the CPU is further configured to remove the scenario which is determined to be not executable from the selected second plurality of the scenarios.

4. The testing device as claimed in claim 2, wherein the CPU is further configured to remove the scenario which is determined to be not executable from the selected second plurality of the scenarios.

* * * * *